United States Patent
Flemming et al.

(10) Patent No.: US 8,966,019 B2
(45) Date of Patent: Feb. 24, 2015

(54) APPLICATION SERVER FOR MAINFRAME COMPUTER SYSTEMS

(75) Inventors: Diane G. Flemming, Pflugerville, TX (US); William A. Maron, Austin, TX (US); Mysore S. Srinivas, Austin, TX (US); Basu Vaidyanathan, Austin, TX (US)

(73) Assignee: International Business Machines Corporation, Armonk, NY (US)

( * ) Notice: Subject to any disclaimer, the term of this patent is extended or adjusted under 35 U.S.C. 154(b) by 893 days.

(21) Appl. No.: 12/822,222

(22) Filed: Jun. 24, 2010

(65) Prior Publication Data

US 2011/0320573 A1    Dec. 29, 2011

(51) Int. Cl.
*G06F 15/177* (2006.01)
*G06F 9/54* (2006.01)
*G06F 3/00* (2006.01)
*H02J 3/14* (2006.01)

(52) U.S. Cl.
CPC ..................................... *G06F 9/541* (2013.01)
USPC ................................ 709/220; 710/8; 307/138

(58) Field of Classification Search
CPC .......................... H04L 29/06; H04L 29/08072
USPC ....................................................... 709/220
See application file for complete search history.

(56) References Cited

U.S. PATENT DOCUMENTS

| 7,181,544 | B2 | 2/2007 | Vangal et al. |
| 7,660,793 | B2 | 2/2010 | Indeck et al. |
| 2006/0294254 | A1 | 12/2006 | Emerson et al. |
| 2007/0228163 | A1 | 10/2007 | Schon et al. |
| 2007/0271356 | A1* | 11/2007 | Lin et al. ......................... 709/220 |
| 2010/0076617 | A1 | 3/2010 | Van Den Keybus et al. |
| 2011/0099297 | A1* | 4/2011 | Hayton ............................. 710/8 |
| 2011/0213863 | A1* | 9/2011 | Shah et al. ..................... 709/220 |
| 2014/0103720 | A1* | 4/2014 | Robinson et al. ............... 307/38 |

OTHER PUBLICATIONS

Bohra, "System Architectures Based on Functionality Offloading", 2008, Rutgers University/New Brunswick, vol. 7008B of Dissertation Abstracts International, p. 4936, 167 pages, ISBN 978-1-109-19465-4.

IBM, "Virtual Root Complexes for optimizing P2P in asymmetric systems", Technical Disclosure, IPCOM000190109D, Nov. 17, 2009, pp. 1-2.

Dobbelstein et al., "Inter-Processor 802 Interface", IPCOM000112640, re-published Mar. 27, 2005 (originally published as IBM TDB v37, No. 5, pp. 315-324 May 1, 1994).

* cited by examiner

*Primary Examiner* — Backhean Tiv
*Assistant Examiner* — Alan S Chou
(74) *Attorney, Agent, or Firm* — Yee & Associates, P.C.; Damion Josephs (57) ABSTRACT

A method, apparatus, and computer program product for running software on an adapter. In response to a connection of a hardware interface for the adapter with a current host computer, a processor unit in the adapter determines whether a set of protocols for communicating with the current host computer to access resources is present on the adapter. In response to the set of protocols being absent on the adapter, the processor unit obtains the set of protocols from the current host computer. The processor unit identifies a set of available resources in the current host computer for use by the adapter using the set of protocols. The processor unit runs software stored on a set of storage devices in the adapter using the set of available resources identified for use by the adapter.

13 Claims, 7 Drawing Sheets

APPLICATION SERVER FOR MAINFRAME COMPUTER SYSTEMS

BACKGROUND

1. Field

The present disclosure relates generally to data processing systems and, in particular, to a method and apparatus for processing data. Still more particularly, the present disclosure relates to a method and apparatus for providing applications to client computers.

2. Description of the Related Art

In network data processing systems, server computers provide services and information to the client computers. For example, the server computers may send operating system images, applications, data, and other types of information to the client computers.

Additionally, the server computers also may process data in response to requests from the client computers. Server computers with the processing power used by various organizations are often referred to as mainframe computers. Mainframe computers often provide processing resources for an organization. For example, these processing resources may be used by organizations to process sentence information, process industry and consumer statistics, process financial transactions, and/or perform other suitable types of operations.

These types of server computers often may receive requests to process data from large numbers of client computers. To process the requests with the desired level of service, processing resources may be increased by adding additional server computers or more powerful server computers. Additionally, load balancing may be performed between different server computers to more efficiently allocate processing resources.

SUMMARY

In the illustrative embodiments, a method, apparatus, and computer program product are provided for running software on an adapter. In response to a connection of a hardware interface for the adapter with a current host computer, a processor unit in the adapter determines whether a set of protocols for communicating with the current host computer to access resources is present on the adapter. In response to the set of protocols being absent on the adapter, the processor unit obtains the set of protocols from the current host computer. The processor unit identifies a set of available resources in the current host computer for use by the adapter using the set of protocols. The processor unit runs software stored on a set of storage devices in the adapter using the set of available resources identified for use by the adapter.

DETAILED DESCRIPTION

As will be appreciated by one skilled in the art, the present invention may be embodied as a system, method, or computer program product. Accordingly, the present invention may take the form of an entirely hardware embodiment, an entirely software embodiment (including firmware, resident software, micro-code, etc.), or an embodiment combining software and hardware aspects that may all generally be referred to herein as a "circuit," "module," or "system." Furthermore, the present invention may take the form of a computer program product embodied in any tangible medium of expression having computer usable program code embodied in the medium.

Any combination of one or more computer usable or computer readable medium(s) may be utilized. The computer usable or computer readable medium may be, for example, but not limited to, an electronic, magnetic, optical, electromagnetic, infrared, or semiconductor system, apparatus, device, or propagation medium. More specific examples (a non-exhaustive list) of the computer readable medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CDROM), an optical storage device, a transmission media, such as those supporting the Internet or an intranet, or a magnetic storage device.

Note that the computer usable or computer readable medium could even be paper or another suitable medium upon which the program is printed, as the program can be electronically captured via, for instance, optical scanning of the paper or other medium, then compiled, interpreted, or otherwise processed in a suitable manner, if necessary, and then stored in a computer memory. In the context of this document, a computer usable or computer readable medium may be any medium that can contain, store, communicate, propagate, or transport the program for use by or in connection with the instruction processing system, apparatus, or device. The computer usable medium may include a propagated data signal with the computer usable program code embodied therewith, either in baseband or as part of a carrier wave. The computer usable program code may be transmitted using any appropriate medium, including, but not limited to, wireless, wireline, optical fiber cable, RF, etc.

Computer program code for carrying out operations of the present invention may be written in any combination of one or more programming languages, including an object-oriented programming language, such as Java, Smalltalk, C++, or the like and conventional procedural programming languages, such as the "C" programming language or similar programming languages. The program code may execute entirely on the user's computer, partly on the user's computer, as a stand-alone software package, partly on the user's computer and partly on a remote computer, or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

The present invention is described below with reference to flowcharts and/or block diagrams of methods, apparatus (systems), and computer program products according to embodiments of the invention. It will be understood that each block of the flowcharts and/or block diagrams, and combinations of blocks in the flowcharts and/or block diagrams, can be implemented by computer program instructions.

These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer program instructions may also be stored in a computer readable medium that can direct a computer or other programmable data processing apparatus to function in a particular manner, such that the instructions stored in the computer readable medium produce an article of manufacture including instruction means which implement the function/act specified in the flowchart and/or block diagram block or blocks.

The computer program instructions may also be loaded onto a computer or other programmable data processing apparatus to cause a series of operational steps to be performed on the computer or other programmable apparatus to produce a computer implemented process such that the instructions which execute on the computer or other programmable apparatus provide processes for implementing the functions/acts specified in the flowchart and/or block diagram block or blocks.

Figure 1:
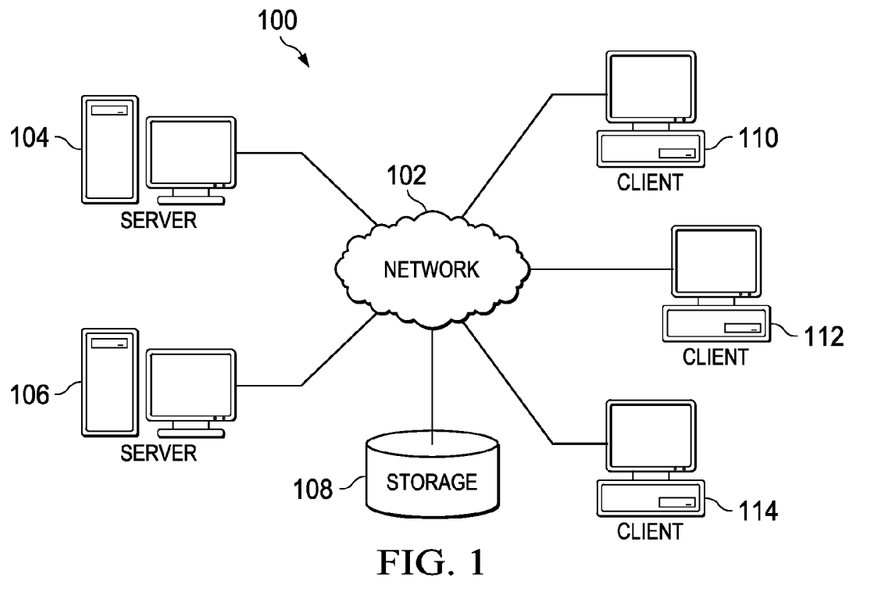
FIG. 1 is a diagram of a data processing environment in which illustrative embodiments may be implemented.

With reference now to the figures and, in particular, with reference to FIG. 1, a diagram of a data processing environment is provided in which illustrative embodiments may be implemented. It should be appreciated that FIG. 1 is only provided as an illustration of one implementation and is not intended to imply any limitation with regard to the environments in which different embodiments may be implemented. Many modifications to the depicted environments may be made.

FIG. 1 depicts a pictorial representation of a network of data processing systems in which illustrative embodiments may be implemented. Network data processing system 100 is a network of computers in which the illustrative embodiments may be implemented. Network data processing system 100 contains network 102, which is the medium used to provide communications links between various devices and computers connected together within network data processing system 100. Network 102 may include connections, such as wire, wireless communication links, or fiber optic cables.

In the depicted example, server computer 104 and server computer 106 connect to network 102 along with storage unit 108. In addition, client computers 110, 112, and 114 connect to network 102. Client computers 110, 112, and 114 may be, for example, personal computers or network computers.

In the depicted example, server computer 104 provides information, such as boot files, operating system images, and applications to client computers 110, 112, and 114. Client computers 110, 112, and 114 are clients to server computer 104 in this example. Network data processing system 100 may include additional server computers, client computers, and other devices not shown.

In the illustrative examples, server computer 104 and server computer 106 may provide processing resources to client computers 110, 112, and 114. For example, server computer 104 may process transactions, host a database, or provide other suitable services. Additionally, server computer 104 and server computer 106 may provide applications that may be used by client computers 110, 112, and 114 to access these services. These applications may be, for example, a web server that provides web pages for access, client programs, or other suitable types of applications. In one or more illustrative embodiments, server computer 104 and server computer 106 may include devices or other hardware that may increase the efficiency, reduce the cost, or a combination of the two in providing services to client computers 110, 112, and 114.

Program code located in network data processing system 100 may be stored on a computer recordable storage medium and downloaded to a data processing system or other device for use. For example, program code may be stored on a computer recordable storage medium on server computer 104 and downloaded to client computer 110 over network 102 for use on client computer 110.

In the depicted example, network data processing system 100 is the Internet with network 102 representing a worldwide collection of networks and gateways that use the Transmission Control Protocol/Internet Protocol (TCP/IP) suite of protocols to communicate with one another. At the heart of the Internet is a backbone of high-speed data communication lines between major nodes or host computers, consisting of thousands of commercial, governmental, educational and other computer systems that route data and messages. Of course, network data processing system 100 also may be implemented as a number of different types of networks, such as, for example, an intranet, a local area network (LAN), or a wide area network (WAN). FIG. 1 is intended as an example, and not as an architectural limitation for the different illustrative embodiments.

Figure 2:
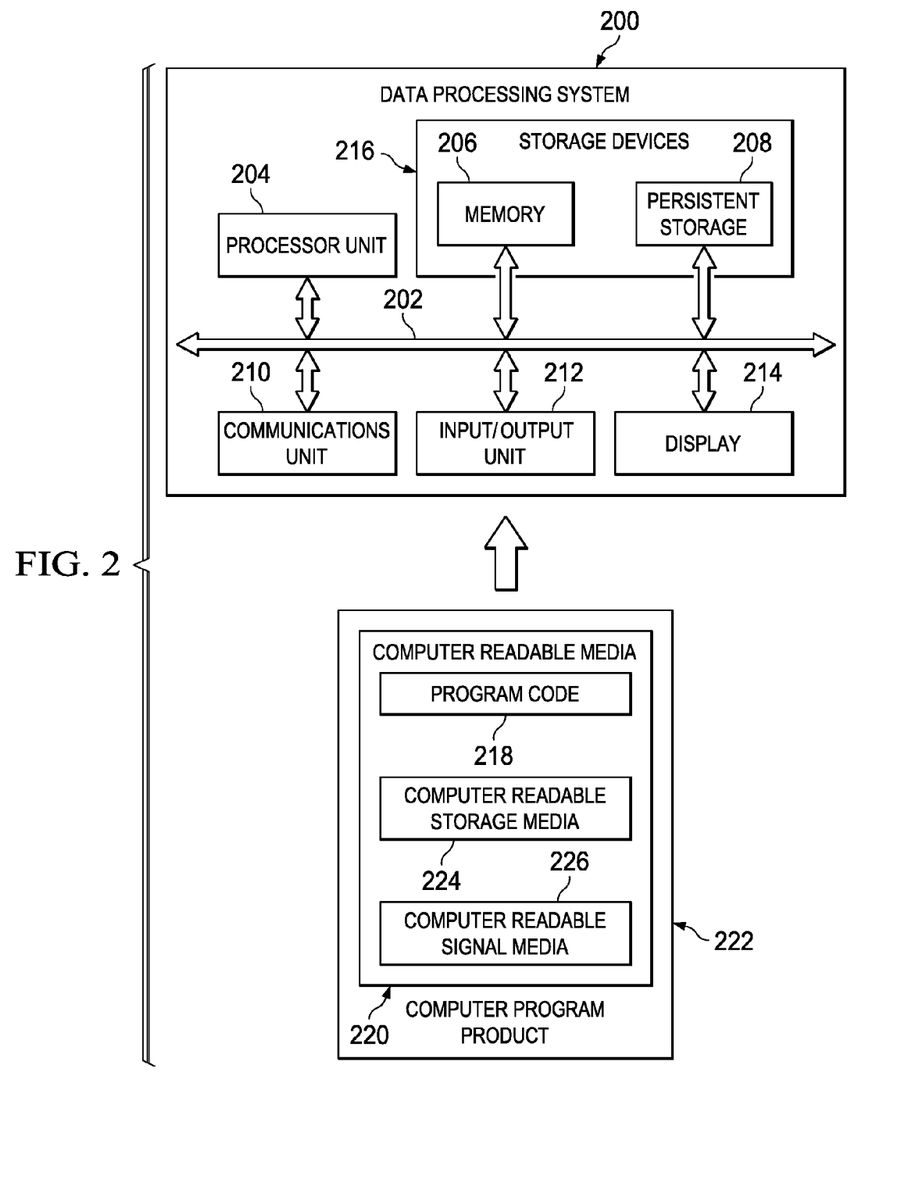
FIG. 2 is an illustration of a data processing system in accordance with an illustrative embodiment.

Turning now to FIG. 2, an illustration of a data processing system is depicted in accordance with an illustrative embodiment. In this illustrative example, data processing system 200 includes communications fabric 202, which provides communications between processor unit 204, memory 206, persistent storage 208, communications unit 210, input/output (I/O) unit 212, and display 214. Data processing system 200 may be used to implement data processing systems in FIG. 1. For example, data processing system 200 may be used to implement server computer 104 or client computer 110 in FIG. 1.

Processor unit 204 serves to execute instructions for software that may be loaded into memory 206. Processor unit 204 may be a number of processors, a multi-processor core, or some other type of processor, depending on the particular implementation. A number, as used herein with reference to an item, means one or more items. Further, processor unit 204 may be implemented using a number of heterogeneous processor systems in which a main processor is present with secondary processors on a single chip. As another illustrative example, processor unit 204 may be a symmetric multi-processor system containing multiple processors of the same type.

Memory 206 and persistent storage 208 are examples of storage devices 216. A storage device is any piece of hardware that is capable of storing information, such as, for example, without limitation, data, program code in functional form, and/or other suitable information either on a temporary basis and/or a permanent basis. Memory 206, in these examples, may be, for example, a random access memory or any other suitable volatile or non-volatile storage device. Persistent storage 208 may take various forms, depending on the particular implementation.

For example, persistent storage 208 may contain one or more components or devices. For example, persistent storage 208 may be a hard drive, a flash memory, a rewritable optical disk, a rewritable magnetic tape, or some combination of the above. The media used by persistent storage 208 also may be removable. For example, a removable hard drive may be used for persistent storage 208.

Communications unit 210, in these examples, provides for communications with other data processing systems or devices. In these examples, communications unit 210 is a network interface card. Communications unit 210 may provide communications through the use of either or both physical and wireless communications links.

Input/output unit 212 allows for input and output of data with other devices that may be connected to data processing system 200. For example, input/output unit 212 may provide a connection for user input through a keyboard, a mouse, and/or some other suitable input device. Further, input/output unit 212 may send output to a printer. Display 214 provides a mechanism to display information to a user.

Instructions for the operating system, applications, and/or programs may be located in storage devices 216, which are in communication with processor unit 204 through communications fabric 202. In these illustrative examples, the instructions are in a functional form on persistent storage 208. These instructions may be loaded into memory 206 for processing by processor unit 204. The processes of the different embodiments may be performed by processor unit 204 using computer implemented instructions, which may be located in a memory, such as memory 206.

These instructions are referred to as program code, computer usable program code, or computer readable program code that may be read and processed by a processor in processor unit 204. The program code in the different embodiments may be embodied on different physical or computer readable storage media, such as memory 206 or persistent storage 208.

Program code 218 is located in a functional form on computer readable media 220 that is selectively removable and may be loaded onto or transferred to data processing system 200 for processing by processor unit 204. Program code 218 and computer readable media 220 form computer program product 222 in these examples. In one example, computer readable media 220 may be computer readable storage media 224 or computer readable signal media 226. Computer readable storage media 224 may include, for example, an optical or magnetic disk that is inserted or placed into a drive or other device that is part of persistent storage 208 for transfer onto a storage device, such as a hard drive, that is part of persistent storage 208. Computer readable storage media 224 also may take the form of a persistent storage, such as a hard drive, a thumb drive, or a flash memory, that is connected to data processing system 200. In some instances, computer readable storage media 224 may not be removable from data processing system 200. In these illustrative examples, computer readable storage media 224 is a non-transitory computer readable storage medium.

Alternatively, program code 218 may be transferred to data processing system 200 using computer readable signal media 226. Computer readable signal media 226 may be, for example, a propagated data signal containing program code 218. For example, computer readable signal media 226 may be an electromagnetic signal, an optical signal, and/or any other suitable type of signal. These signals may be transmitted over communications links, such as wireless communications links, optical fiber cable, coaxial cable, a wire, and/or any other suitable type of communications link. In other words, the communications link and/or the connection may be physical or wireless in the illustrative examples.

In some illustrative embodiments, program code 218 may be downloaded over a network to persistent storage 208 from another device or data processing system through computer readable signal media 226 for use within data processing system 200. For instance, program code stored in a computer readable storage medium in a server data processing system may be downloaded over a network from the server to data processing system 200. The data processing system providing program code 218 may be a server computer, a client computer, or some other device capable of storing and transmitting program code 218.

The different components illustrated for data processing system 200 are not meant to provide architectural limitations to the manner in which different embodiments may be implemented. The different illustrative embodiments may be implemented in a data processing system including components in addition to or in place of those illustrated for data processing system 200. Other components shown in FIG. 2 can be varied from the illustrative examples shown. The different embodiments may be implemented using any hardware device or system capable of running program code. As one example, the data processing system may include organic components integrated with inorganic components and/or may be comprised entirely of organic components excluding a human being. For example, a storage device may be comprised of an organic semiconductor.

As another example, a storage device in data processing system 200 is any hardware apparatus that may store data. Memory 206, persistent storage 208, and computer readable media 220 are examples of storage devices in a tangible form.

In another example, a bus system may be used to implement communications fabric 202 and may be comprised of one or more buses, such as a system bus or an input/output bus. Of course, the bus system may be implemented using any suitable type of architecture that provides for a transfer of data between different components or devices attached to the bus system. Additionally, a communications unit may include one or more devices used to transmit and receive data, such as a modem or a network adapter. Further, a memory may be, for example, memory 206, or a cache, such as found in an interface and memory controller hub that may be present in communications fabric 202.

The different illustrative embodiments recognize and take into account a number of different considerations. For example, the different illustrative embodiments recognize and take into account that it is often desirable to use the processing resources of a mainframe computer for processing data rather than for other activities, such as dispatching applications to client computers. The different illustrative embodiments recognize and take into account that currently available server computers often do not have a mechanism or system to offload these types of activities. It would be desirable to run an application on a different data processing system or device without using the processing resources of the server computer.

Thus, the different illustrative embodiments provide a method and apparatus for running software on an adapter. In response to a connection of a hardware interface for the adapter to a current host computer, a determination is made as to whether a set of protocols for communicating with the host computer to access resources is present on the adapter. In response to the set of protocols being absent on the adapter, the set of protocols is obtained from the current host computer. A set of accessible resources in the current host computer is identified for use by the adapter. Software stored on a set of storage devices on the adapter are run using the set of protocols to access the set of accessible resources identified for use by the adapter while running the software.

Figure 3:
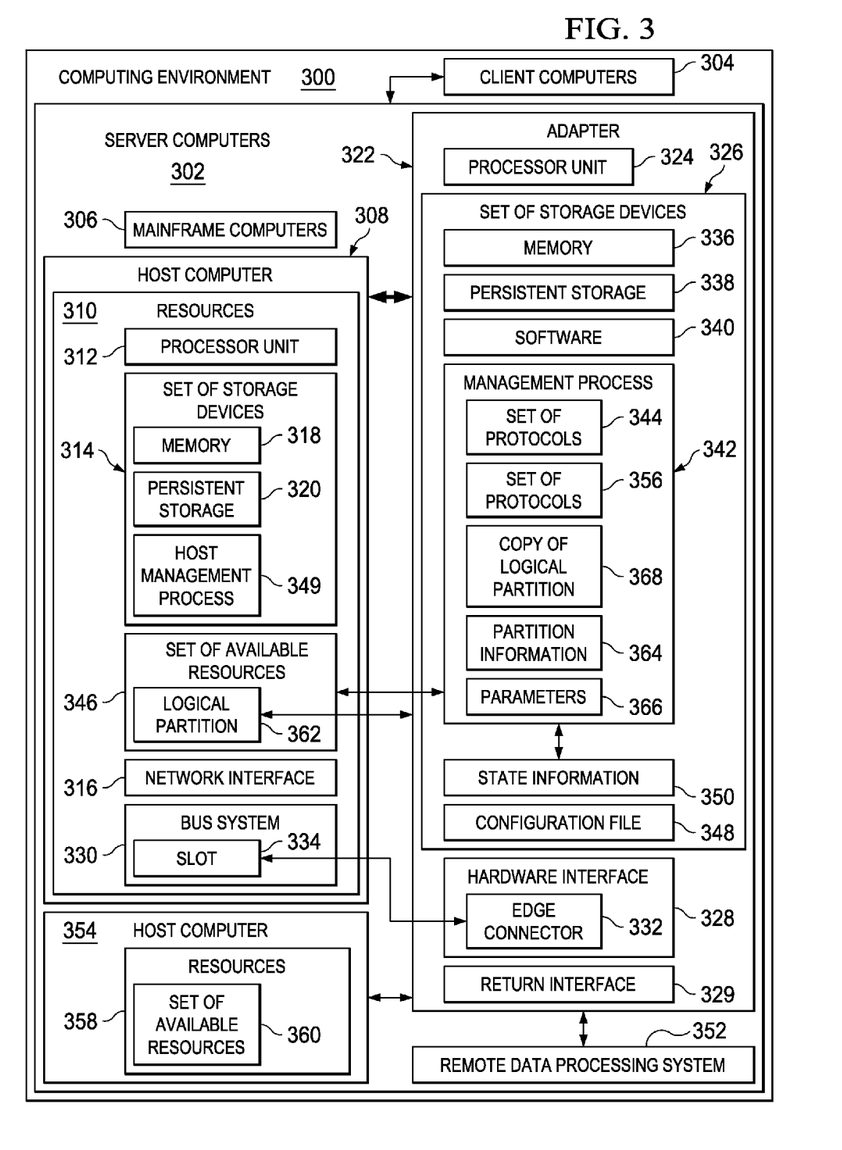
FIG. 3 is an illustration of a computing environment in accordance with an illustrative embodiment.

With reference now to FIG. 3, an illustration of a computing environment is depicted in accordance with an illustrative embodiment. In these depicted examples, computing environment 300 is an example of an environment that may be implemented within network data processing system 100 in FIG. 1 using a data processing system, such as data processing system 200 in FIG. 2.

Server computers 302 are present within computing environment 300. Server computers 302 provide processing resources to handle requests from client computers 304. In these illustrative examples, server computers 302 include mainframe computers 306.

Host computer 308 in server computers 302 has resources 310, which may be used to process requests from client computers 304. In the illustrative examples, resources 310 include, for example, without limitation, processor unit 312, set of storage devices 314, and network interface 316. Set of storage devices 314, in these examples, includes memory 318 and persistent storage 320. As used herein, a "set", when used with reference to items, means one or more items. For example, set of storage devices 314 is one or more storage devices.

In these illustrative examples, adapter 322 may be connected to host computer 308. Adapter 322 includes processor unit 324, set of storage devices 326, hardware interface 328, and return interface 329. Hardware interface 328, in these examples, may be connected to bus system 330 in host computer 308. In particular, hardware interface 328 may take the form of edge connector 332, which may be inserted into slot 334 in bus system 330. Set of storage devices 326 includes memory 336 and persistent storage 338.

In these examples, persistent storage 320 and persistent storage 338 may take a number of different forms. For example, persistent storage 320 may be non-volatile random access memory, a hard disk drive, a solid state disk drive, or any other type of suitable storage device that may retain information when power is no longer applied.

In these depicted examples, software 340 is stored on set of storage devices 326 in adapter 322. Software 340 may take a number of different forms and may be comprised of a number of layers. For example, without limitation, software 340 may comprise at least one of an application server, an operating system, a web server, middleware, a browser, a load balancing program, and other suitable types of software. The operating system may be one layer of software 340, while the middleware and web server may be additional layers of software 340.

When hardware interface 328 is connected to host computer 308, management process 342 runs on processor unit 324 to determine whether set of protocols 344 is present for communicating with host computer 308. In these examples, hardware interface 328 is connected to host computer 308 such that electrical signals can flow between hardware interface 328 and host computer 308. Set of protocols 344 is program code for software that is used to exchange information between host computer 308 and adapter 322 in these examples. In particular, set of protocols 344 are protocols used to access and use resources 310. Responsive to an absence of set of protocols 344 being present on adapter 322, management process 342 requests set of protocols 344 from host computer 308. In these illustrative examples, set of protocols 344 may be for some or all of resources 310. Thereafter, management process 342 identifies set of available resources 346 within resources 310.

Set of available resources 346 desired for use by adapter 322 is identified using configuration file 348 stored on set of storage devices 326. Configuration file 348 identifies resources that adapter 322 and/or software 340 uses during running of software 340. These resources may be, for example, an amount of power, memory, persistent storage space, and other suitable resources. The resources identified in configuration file 348 are used by management process 342 to request those resources from resources 310 in host computer 308. Host management process 349 receives this request and allocates set of available resources 346 from resources 310 to adapter 322. Set of available resources 346 may not include all of the resources requested in some instances.

Set of protocols 344 is used by management process 342 to access set of available resources 346 in resources 310. Set of protocols 344 may be, for example, at least one of a device driver, an application program interface, and other suitable protocols. Set of available resources 346 is resources that can be allocated to adapter 322 for use. For example, set of available resources 346 includes at least one of power, processor resources, storage, a network interface, a logical partition, and other suitable types of resources.

As used herein, the phrase "at least one of", when used with a list of items, means that different combinations of one or more of the listed items may be used and only one of each item in the list may be needed. For example, "at least one of item A, item B, and item C" may include, for example, without limitation, item A or item A and item B. This example also may include item A, item B, and item C or item B and item C. In other examples, "at least one of" may be, for example, without limitation, two of item A, one of item B, and 10 of item C; four of item B and seven of item C; and other suitable combinations.

Set of protocols 344 are used by management process 342 to communicate with host computer 308 to access resources 310. In some cases, set of available resources 346 may be a null set in which no resources are available, depending on the use of resources 310 in host computer 308.

After set of available resources 346 have been identified, software 340 is run by processor unit 324 using set of protocols 344 to access set of available resources 346 identified for use by adapter 322. In other words, software 340 may access set of available resources 346 while running on processor unit 324. For example, software 340 may use memory 318 or persistent storage 320 in resources 310 on host computer 308.

In these illustrative examples, management process 342 stores state information 350. State information 350 is stored in set of storage devices 326 in these illustrative examples. In other illustrative examples, state information 350 may be stored on remote data processing system 352 or in set of storage devices 314 in host computer 308. State information 350 may be stored based on an interval of time. For example, state information 350 may be stored every 100 milliseconds or every five seconds. Additionally, each layer in software 340 may store state information 350.

The storing of state information 350 allows for adapter 322 to be moved from the current host computer, host computer 308, to a new host computer, host computer 354. In other words, removal of adapter 322 from host computer 308 will not cause a loss of information because state information 350 is stored.

In these examples, movement of adapter 322 may be made such that software 340 is able to resume running on host computer 354 without having to be restarted. In response to a connection of hardware interface 328 to host computer 354, management process 342 also determines whether set of protocols 356 is present for communicating with host computer 354 to access resources 358 in host computer 354. If set of protocols 356 is not present in adapter 322, management process 342 obtains set of protocols 356 from host computer 354. Thereafter, management process 342 identifies set of available resources 360 in resources 358 for use by adapter 322. The process then resumes running software 340 using set of available resources 360.

Of course, if set of available resources 360 does not provide sufficient resources needed by software 340, software 340 may modify its running to use the reduced resources. Further, if information is needed that may have been stored in set of available resources 346, software 340 may restart, rather than resume running, when adapter 322 is connected to host computer 354.

In some illustrative examples, set of available resources 346 may include logical partition 362. Logical partition 362 is configured to run at least a portion of software 340. In these examples, at least a portion may be some or all of software 340. In this illustrative example, at least a portion of the software running in logical partition 362 may be moved from host computer 308 to run on adapter 322. In this example, partition information 364 is identified, and parameters 366 are set for software 340. The setting of parameters 366 for software 340 configures software 340 to form copy of logical partition 368 that is run on adapter 322.

The illustration of computing environment 300 in FIG. 3 is not meant to imply physical or architectural limitations to the manner in which different illustrative embodiments may be implemented. Other components in addition to and/or in place of the ones illustrated may be used. Some components may be unnecessary in some illustrative embodiments. Also, the blocks are presented to illustrate some functional components. One or more of these blocks may be combined and/or divided into different blocks when implemented in different illustrative embodiments.

For example, in some illustrative embodiments, additional adapters, in addition to adapter 322, may be connected to host computer 308. As yet another example, in some illustrative embodiments, adapter 322 may not include all of the components illustrated in FIG. 3. For example, return interface 329 may be omitted. In yet other illustrative embodiments, set of storage devices 326 may be only a memory, which may be a random access memory or a non-volatile random access memory.

Figure 4:
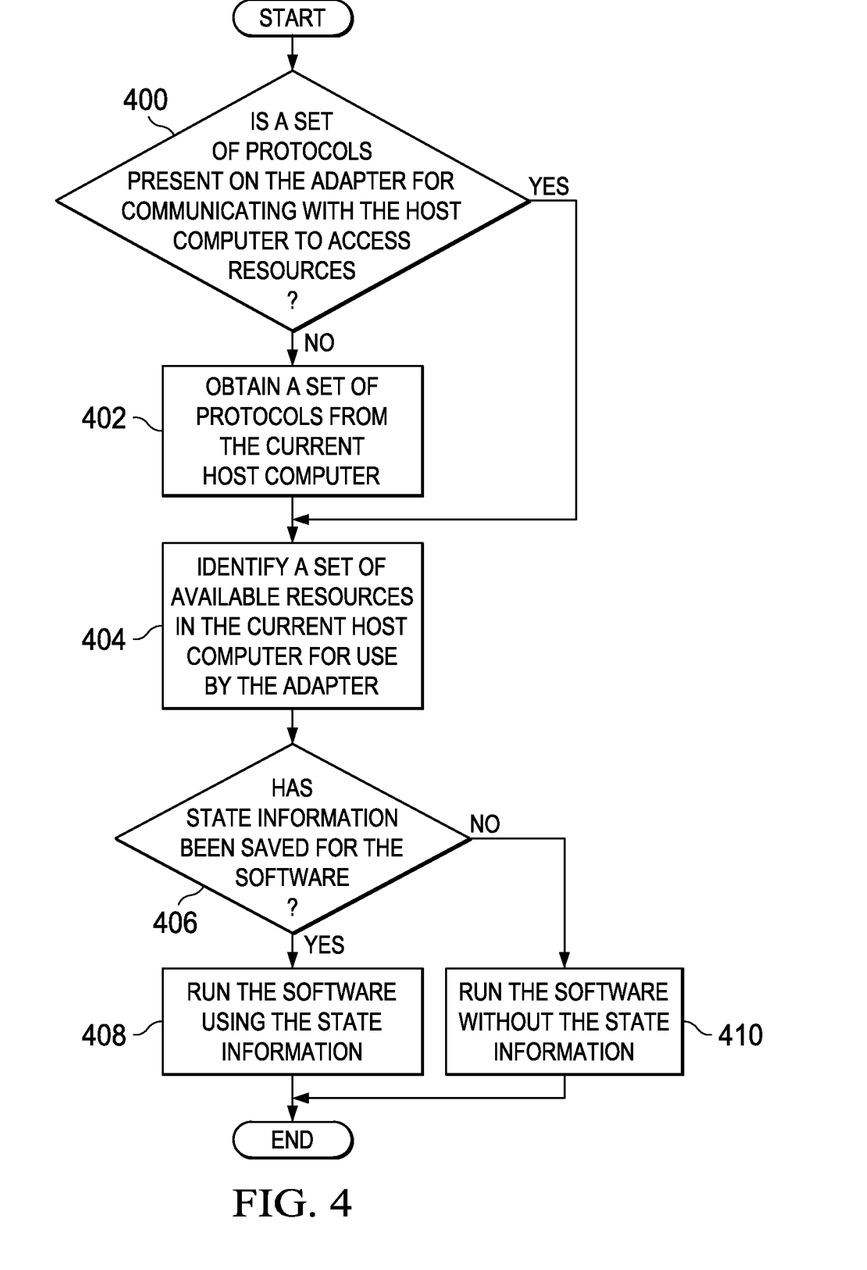
FIG. 4 is a flowchart of a process for running software on an adapter in accordance with an illustrative embodiment.

With reference now to FIG. 4, a flowchart of a process for running software on an adapter is depicted in accordance with an illustrative embodiment. The process in this illustrative example may be implemented in management process 342 in FIG. 3.

The process begins when the adapter is connected to a computer, such as host computer 308 in FIG. 3. A determination is made as to whether a set of protocols are present on the adapter for communicating with the host computer to access resources (step 400). In response to the set of protocols being absent on the adapter, the process obtains a set of protocols from the current host computer (step 402). In this example, the current host computer is the computer to which the adapter is connected.

The process then identifies a set of available resources in the current host computer for use by the adapter (step 404). This step may include sending a request to the host computer for resources that are desired for use by the adapter. The host computer may return a response with the resources that can be used by the adapter.

A determination is made as to whether state information has been saved for the software (step 406). In these examples, the state information may be saved locally in a set of storage devices on the adapter. In other illustrative examples, the state information may be saved on the current host computer or another data processing system. The data processing system may be, for example, without limitation, a remote server computer, a client computer, another adapter, or some other suitable type of data processing system that can be accessed by the adapter.

If state information is saved for the software, the process runs the software using the state information (step 408), with the process terminating thereafter. In step 408, by running the software using the state information, the software may resume running from the point in time in which the state information was saved. On the other hand, if state information has not been saved for the software in step 406, the process runs the software without the state information (step 410), with the process terminating thereafter. In both steps 408 and 410, the software may access the available resources while running on the adapter.

With reference again to step 400, if a set of protocols is present on the adapter for communicating with the host computer to access resources, the process continues to step 404 as described above.

Figure 5:
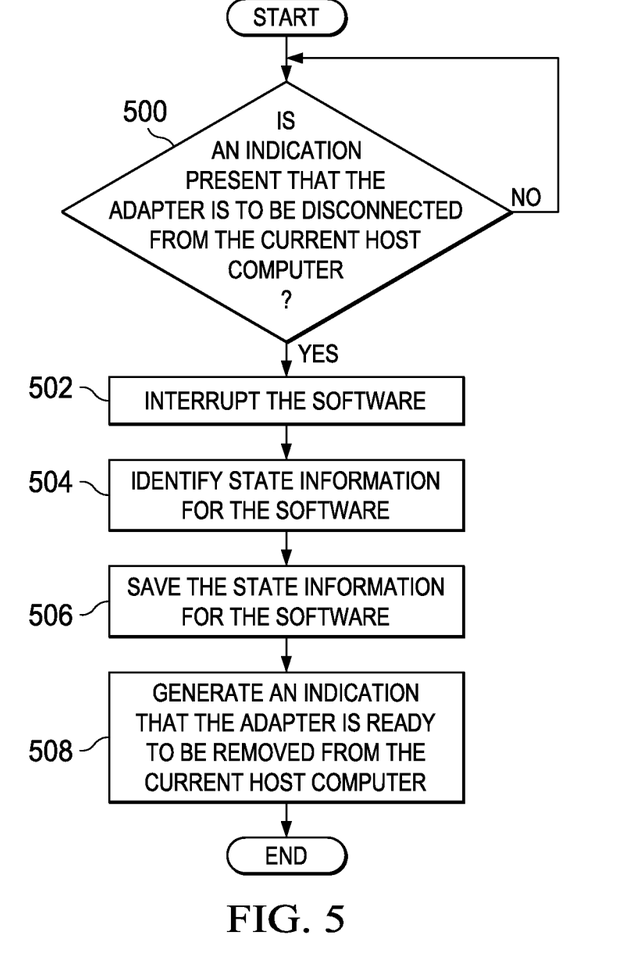
FIG. 5 is a flowchart of a process for saving state information in accordance with an illustrative embodiment.

With reference now to FIG. 5, a flowchart of a process for saving state information is depicted in accordance with an illustrative embodiment. The process illustrated in FIG. 5 may be implemented in management process 342 in FIG. 3.

The process begins by determining whether an indication is present that the adapter is to be disconnected from the current host computer (step 500). In step 500, the indication may be from a user. For example, the indication may be the user pressing a button on the adapter. In another example, the indication may be input entered by a user through a user interface.

If the adapter is not to be disconnected from the current host computer, the process returns to step 500. Otherwise, the process interrupts the software (step 502). The process identifies state information for the software (step 504). In this step, different values for registers, memory addresses, and other information are identified for the software. This information is information needed to resume running the software.

The process then saves the state information for the software (step 506). In this illustrative example, the adapter is configured such that state information is always saved when there is an indication to disconnect the adapter from the current host computer. In these examples, the state information is saved in a persistent storage, such as a non-volatile random access memory, a hard disk drive, a solid state disk drive, or some other suitable type of storage device. The process generates an indication that the adapter is ready to be removed from the current host computer (step 508), with the process terminating thereafter.

In other illustrative embodiments, state information may be continuously saved for the software. With this type of process, the software may resume running after an unexpected power loss. The power loss may occur from the host computer disabling the adapter or the host computer losing power. Additionally, the power loss may occur from the adapter being physically removed from the host computer.

Figure 6:
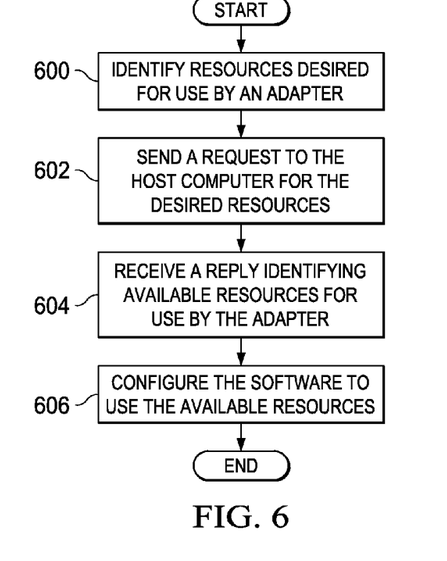
FIG. 6 is a flowchart of a process for identifying accessible resources on a host computer in accordance with an illustrative embodiment.

With reference now to FIG. 6, a flowchart of a process for identifying accessible resources on a host computer is depicted in accordance with an illustrative embodiment. The process illustrated in FIG. 6 may be implemented in management process 342 in FIG. 3.

The process begins by identifying resources desired for use by an adapter (step 600). This identification is made using configuration file 348 in FIG. 3 in this illustrative example. The process then sends a request to the host computer for the desired resources (step 602). The process receives a reply identifying available resources for use by the adapter (step 604). In step 604, the reply may include information needed to access these resources using the set of protocols. For example, the reply may include an identification of memory ranges, an amount of power that is supplied to the adapter, and other suitable information. The process then configures the software to use the available resources (step 606), with the process terminating thereafter.

Figure 7:
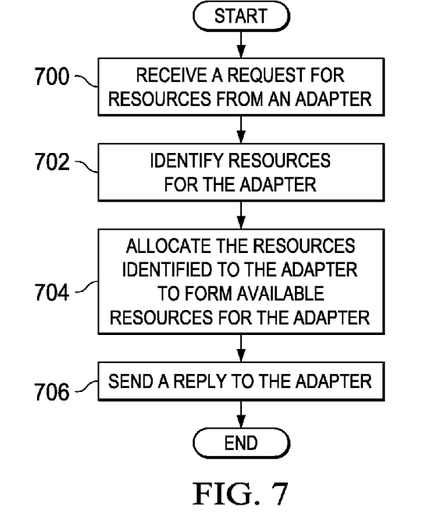
FIG. 7 is a flowchart of a process for allocating resources to an adapter in accordance with an illustrative embodiment.

Turning next to FIG. 7, a flowchart of a process for allocating resources to an adapter is depicted in accordance with an illustrative embodiment. The process in FIG. 7 may be implemented in host management process 349 in FIG. 3.

The process begins by receiving a request for resources from an adapter (step 700). The process then identifies resources for the adapter (step 702). The process allocates the resources identified to the adapter to form available resources for the adapter (step 704). The process then sends a reply to the adapter (step 706), with the process terminating thereafter. This reply contains an identification of the available resources from the adapter in the illustrative examples.

Figure 8:
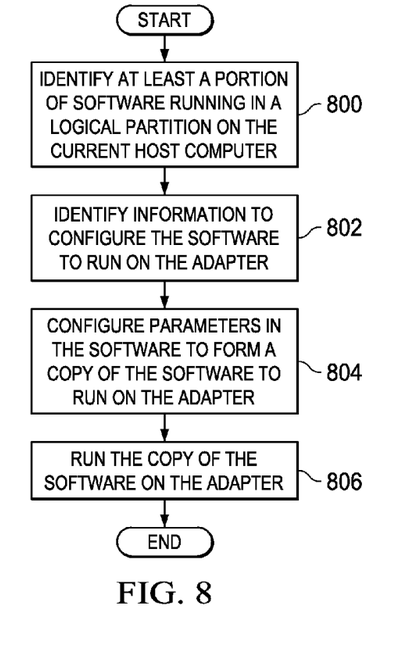
FIG. 8 is a flowchart of a process for running software in accordance with an illustrative embodiment.

Turning now to FIG. 8, a flowchart of a process for running software is depicted in accordance with an illustrative embodiment. The process illustrated in FIG. 8 may be implemented in management process 342 in FIG. 3. This process may be an example of one manner in which step 410 in FIG. 4 may be implemented to run software on an adapter.

The process begins by identifying at least a portion of software running in a logical partition on the current host computer (step 800). In step 800, the software identified may be identified to run on an adapter based on a number of factors. These factors may include, for example, without limitation, cost, processing power, electrical power requirements, hardware limitations, available resources, performance criteria, and/or other suitable factors. The process then identifies information to configure the software to run on the adapter (step 802). This information may be identified from partition information stored on the current host computer.

Next, the process configures parameters in the software to form a copy of the software to run on the adapter (step 804). The process then runs the copy of the software on the adapter (step 806), with the process terminating thereafter. In this manner, software running in the logical partition may be copied or moved from a host computer to an adapter. With the copy of the software, the adapter may also be moved from one host computer to another host computer. For example, in step 408 in FIG. 4, when the software resumes running with the state information, the copy of the software on the adapter may resume operation. In this illustrative example, the copy of the software running on the adapter may be updated independently of the software running in the logical partition.

Figure 9:
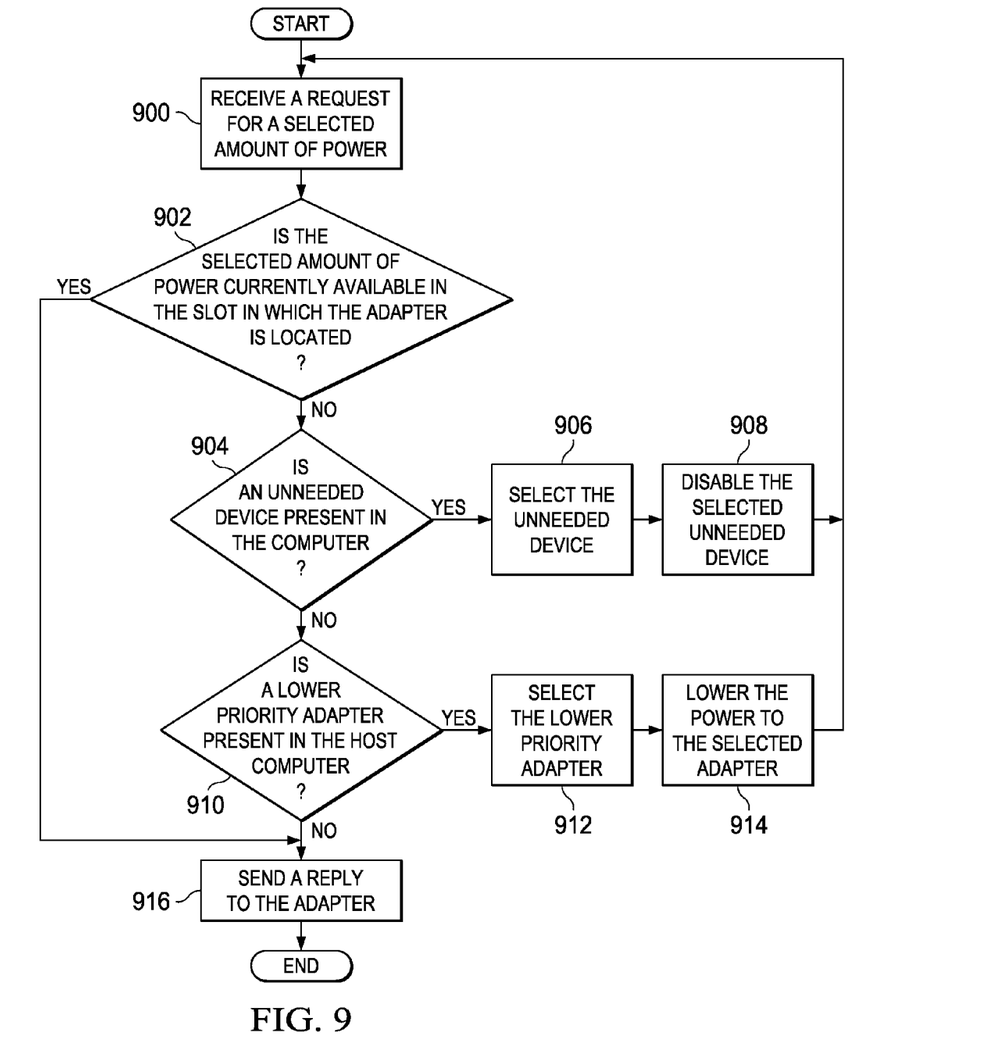
FIG. 9 is a flowchart of a process for allocating power to an adapter in accordance with an illustrative embodiment.

Turning next to FIG. 9, a flowchart of a process for allocating power to an adapter is depicted in accordance with an illustrative embodiment. The process illustrated in FIG. 9 may be implemented in host management process 349 running on host computer 308 in FIG. 3 in these examples. Power is an example of one resource that may be requested by an adapter.

The process begins by receiving a request for a selected amount of power (step 900). A determination is made as to whether the selected amount of power requested is currently available in the slot in which the adapter is located (step 902). If the requested amount of power is not available in the slot, a determination is made as to whether an unneeded device is present in the computer (step 904). An unneeded device is a device that is not currently used by the host computer. Further, an unneeded device also may be a device that is currently unused and not predicted to be needed by the host computer based on the current software running on the host computer. In these illustrative examples, an unneeded device may take different forms. For example, an unneeded device may be a hard disk drive, a network adapter, a digital versatile disk drive, or some other suitable device.

If an unneeded device is present in step 904, the unneeded device is selected (step 906). When multiple unneeded devices are present, the unneeded device may be selected based on a priority assigned to the unneeded devices. The process then disables the selected unneeded device (step 908), with the process returning to step 900 to determine whether the power now available meets the request from the adapter.

With reference again to step 904, if an unneeded device is not present, a determination is made as to whether a lower priority adapter is present in the host computer (step 910). If a lower priority adapter is present in the host computer, the lower priority adapter is selected (step 912). In step 912, if multiple adapters with a lower priority are present, the adapter may be selected in a number of different ways. For example, the adapter with the lowest priority may be selected. If the adapters have the same priority, the adapter may be selected based on whether reducing power to that adapter will provide the power needed for the adapter requesting power from the host computer.

The process then lowers the power to the selected adapter (step 914), with the process returning to step 900. Lowering the power also may include reducing the power to zero. As a result, this type of lowering of power disables the adapter. Lowering the power may include, for example, slowing down parts of the host computers, disabling non-required parts of the computer, and/or performing other suitable operations to lower the power.

With reference again to step 910, if a lower priority adapter is not present in the host computer, the process sends a reply to the adapter (step 916), with the process terminating thereafter. The reply, in these examples, includes an indication of the amount of power that is being supplied to the slot in which the adapter is located. For example, if the reply indicates that the power being supplied is less than the selected amount of power requested, the adapter may make adjustments such that less power is needed by the adapter. With reference again to step 902, if the power now available in the slot meets the request from the adapter, the process continues to step 916 as described above.

The flowcharts and block diagrams in the figures illustrate the architecture, functionality, and operation of possible implementations of systems, methods, and computer program products according to various embodiments of the present invention. In this regard, each block in the flowcharts or block diagrams may represent a module, segment, or portion of code, which comprises one or more executable instructions for implementing the specified logical function(s). It should also be noted that, in some alternative implementations, the functions noted in the block may occur out of the order noted in the figures.

For example, operations in two blocks shown in succession may, in fact, be performed substantially concurrently, or the blocks may sometimes be performed in the reverse order, depending upon the functionality involved. It will also be noted that each block of the block diagrams and/or flowcharts, and combinations of blocks in the block diagrams and/or flowcharts, can be implemented by special purpose hardware-based systems that perform the specified functions or acts, or combinations of special purpose hardware and computer instructions.

As one illustrative example, a step may be added to the process illustrated in FIG. 5. In this additional step, the process may determine whether to save the state information before saving the state information in step 506 in FIG. 5. In another example, in FIG. 9, steps 904 and 910 may be reversed from the order shown. The decision for step 910 may be made before the decision in step 904 in some illustrative embodiments.

The terminology used herein is for the purpose of describing particular embodiments only and is not intended to be limiting of the invention. As used herein, the singular forms "a", "an", and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

The corresponding structures, materials, acts, and equivalents of all means or step plus function elements in the claims below are intended to include any structure, material, or act for performing the function in combination with other claimed elements as specifically claimed. The description of the present invention has been presented for purposes of illustration and description, but is not intended to be exhaustive or limited to the invention in the form disclosed. Many modifications and variations will be apparent to those of ordinary skill in the art without departing from the scope and spirit of the invention. The embodiment was chosen and described in order to best explain the principles of the invention and the practical application, and to enable others of ordinary skill in the art to understand the invention for various embodiments with various modifications as are suited to the particular use contemplated.

The invention can take the form of an entirely hardware embodiment, an entirely software embodiment, or an embodiment containing both hardware and software elements. In a preferred embodiment, the invention is implemented in software, which includes, but is not limited to, firmware, resident software, microcode, etc.

Furthermore, the invention can take the form of a computer program product accessible from a computer usable or computer readable medium providing program code for use by or in connection with a computer or any instruction processing system. For the purposes of this description, a computer usable or computer readable medium can be any tangible apparatus that can contain, store, communicate, propagate, or transport the program for use by or in connection with the instruction processing system, apparatus, or device.

The medium can be an electronic, magnetic, optical, electromagnetic, infrared, or semiconductor system (or apparatus or device) or a propagation medium. Examples of a computer readable medium include a semiconductor or solid state memory, magnetic tape, a removable computer diskette, a random access memory (RAM), a read-only memory (ROM), a rigid magnetic disk, and an optical disk. Current examples of optical disks include compact disk-read only memory (CD-ROM), compact disk-read/write (CD-R/W), and DVD.

A data processing system suitable for storing and/or executing program code will include at least one processor coupled directly or indirectly to memory elements through a system bus. The memory elements can include local memory employed during actual processing of the program code, bulk storage, and cache memories which provide temporary storage of at least some program code in order to reduce the number of times code must be retrieved from bulk storage during processing of the program code.

Input/output or I/O devices (including, but not limited to, keyboards, displays, pointing devices, etc.) can be coupled to the system either directly or through intervening I/O controllers.

Network adapters may also be coupled to the system to enable the data processing system to become coupled to other data processing systems, remote printers, or storage devices through intervening networks. Modems, cable modem, and Ethernet cards are just a few of the currently available types of network adapters.

The description of the present invention has been presented for purposes of illustration and description and is not intended to be exhaustive or limited to the invention in the form disclosed. Many modifications and variations will be apparent to those of ordinary skill in the art. The embodiment was chosen and described in order to best explain the principles of the invention, the practical application, and to enable others of ordinary skill in the art to understand the invention for various embodiments with various modifications as are suited to the particular use contemplated.

What is claimed is:

1. A method for running software on a hardware adapter, the method comprising:

responsive to a connection of a hardware interface for an edge connector of the hardware adapter inserted into a slot of a bus system in a current host computer, determining, by a processor unit in the hardware adapter, whether a set of protocols for communicating with the current host computer to access resources of the current host computer is present on the hardware adapter;

responsive to the set of protocols being absent on the hardware adapter, obtaining, by the processor unit in the hardware adapter, the set of protocols from the current host computer;

identifying, by the processor unit in the hardware adapter, a set of available resources in the current host computer for use by the hardware adapter using the set of protocols;

running, by the processor unit in the hardware adapter, the software stored on a set of storage devices in the hardware adapter using the set of available resources identified for use by the hardware adapter;

receiving, by the processor unit in the hardware adapter, a notification from the current host computer indicating an amount of power being supplied to the hardware adapter is less than an amount of power requested by the hardware adapter in response to the current host computer determining that the amount of power requested by the hardware adapter is not available in the slot of the bus system of the current host computer in which the edge connector of the hardware adapter is inserted, determining that a set of unneeded devices is not present within the current host computer, and determining that a set of lower priority hardware adapters is not present within the current host computer; and responsive to the processor unit in the hardware adapter receiving the notification from the current host computer indicating the amount of power being supplied to the hardware adapter is less than the amount of power requested by the hardware adapter, reducing, by the processor unit in the hardware adapter, an amount of power needed by the hardware adapter.

2. The method of claim 1 further comprising: storing, by the processor unit in the hardware adapter, state information for the hardware adapter.

3. The method of claim 2, wherein the storing step comprises: storing, by the processor unit in the hardware adapter, the state information for the hardware adapter in response to a request to move the hardware adapter from the current host computer to a new host computer.

4. The method of claim 2 further comprising:
moving the hardware adapter from the current host computer to a new host computer;
responsive to a new connection of the edge connector of the hardware interface for the hardware adapter with a bus system of the new host computer, determining, by the processor unit in the hardware adapter, whether a new set of protocols is present on the hardware adapter to communicate with the new host computer;
responsive to the new set of protocols being absent on the hardware adapter, obtaining, by the processor unit in the hardware adapter, the new set of protocols from the new host computer;
identifying, by the processor unit in the hardware adapter, a new set of available resources in the new host computer for use by the hardware adapter using the new set of protocols; and
resuming running, by the processor unit in the hardware adapter, the software using the new set of available resources on the new host computer and the state information.

5. The method of claim 1, wherein the software is a copy of at least a portion of the software running in a logical partition and wherein the running step comprises:
identifying, by the processor unit in the hardware adapter, the software running in the logical partition on the current host computer;
configuring, by the processor unit in the hardware adapter, parameters in the software running in the logical partition to form the copy of the at least a portion of the software running in the logical partition; and
running, by the processor unit in the hardware adapter, the copy of the at least a portion of the software on the hardware adapter.

6. A hardware adapter comprising:
an edge connector of a hardware interface of the hardware adapter that is configured to be inserted into a slot of a bus system in a current host computer;
a set of storage devices; and
a processor unit configured to determine whether a set of protocols for communicating with the current host computer to access resources is present on the hardware adapter in response to a connection of the hardware interface for the edge connector of the hardware adapter inserted into the slot of the bus system in the current host computer; obtain the set of protocols from the current host computer for communicating with the current host computer in response to the set of protocols being absent on the hardware adapter; identify a set of available resources in the current host computer for use by the hardware adapter using the set of protocols; run software stored on the set of storage devices in the hardware adapter using the set of available resources identified for use by the hardware adapter; receive a notification from the current host computer indicating an amount of power being supplied to the hardware adapter is less than an amount of power requested by the hardware adapter in response to the current host computer determining that the amount of power requested by the hardware adapter is not available in the slot of the bus system of the current host computer in which the edge connector of the hardware adapter is inserted, determining that a set of unneeded devices is not present within the current host computer, and determining that a set of lower priority hardware adapters is not present within the current host computer; and reduce an amount of power needed by the hardware adapter in response to receiving the notification from the current host computer indicating the amount of power being supplied to the hardware adapter is less than the amount of power requested by the hardware adapter.

7. The hardware adapter of claim 6, wherein the software is configured to store information about a state of the software running on the processor unit in the hardware adapter.

8. The hardware adapter of claim 7, wherein the software is configured to store the information about the state of the software running on the processor unit in the hardware adapter in response to a request to move the hardware adapter from the current host computer to a new host computer.

9. The hardware adapter of claim 7, wherein the software is configured to store the information about the state of the software on a remote data processing system.

10. A computer program product for running software on a hardware adapter comprising:
a non-transitory computer readable storage medium;
program code, stored on the computer readable storage medium, for determining whether a set of protocols for communicating with a current host computer to access resources is present on the hardware adapter in response to a connection of an a hardware interface for an edge connector of the hardware adapter inserted into a slot of a bus system in the current host computer;
program code, stored on the non-transitory computer readable storage medium, for obtaining the set of protocols from the current host computer in response to the set of protocols being absent on the hardware adapter;
program code, stored on the non-transitory computer readable storage medium, for identifying a set of available resources in the current host computer for use by the hardware adapter using the set of protocols;
program code, stored on the non-transitory computer readable storage medium, for running the software stored on a set of storage devices in the hardware adapter using the set of available resources identified for use by the hardware adapter;
program code, stored on the non-transitory computer readable storage medium, for receiving a notification from the current host computer indicating an amount of power being supplied to the hardware adapter is less than an amount of power requested by the hardware adapter in response to the current host computer determining that the amount of power requested by the hardware adapter is not available in the slot of the bus system of the current host computer in which the edge connector of the hardware adapter is inserted, determining that a set of unneeded devices is not present within the current host computer, and determining that a set of lower priority hardware adapters is not present within the current host computer; and
program code, stored on the non-transitory computer readable storage medium, for reducing an amount of power needed by the hardware adapter in response to receiving the notification from the current host computer indicating the amount of power being supplied to the hardware adapter is less than the amount of power requested by the hardware adapter.

11. The computer program product of claim 10 further comprising: program code, stored on the non-transitory computer readable storage medium, for storing state information for the hardware adapter.

12. The computer program product of claim 11 further comprising:
   program code, stored on the non-transitory computer readable storage medium, for moving the hardware adapter from the current host computer to a new host computer;
   program code, stored on the non-transitory computer readable storage medium, for determining whether a new set of protocols is present on the hardware adapter to communicate with the new host computer in response to a new connection of the edge connector of the hardware interface for the hardware adapter with the new host computer;
   program code, stored on the non-transitory computer readable storage medium, for obtaining the new set of protocols from the new host computer in response to the new set of protocols being absent on the hardware adapter;
   program code, stored on the non-transitory computer readable storage medium, for identifying a new set of available resources in the new host computer for use by the hardware adapter using the new set of protocols; and
   program code, stored on the non-transitory computer readable storage medium, for resuming running the software using the new set of available resources on the new host computer and the state information.

13. The computer program product of claim 10, wherein the program code, stored on the non-transitory computer readable storage medium, for running the software stored on the set of storage devices in the hardware adapter using the set of available resources identified for use by the hardware adapter comprises:
   program code, stored on the non-transitory computer readable storage medium, for identifying a logical partition on the current host computer;
   program code, stored on the non-transitory computer readable storage medium, for configuring parameters in the software to form a copy of the logical partition; and
   program code, stored on the non-transitory computer readable storage medium, for running the copy of the logical partition on the hardware adapter.

* * * * *